United States Patent
Batzold

[15] 3,658,595
[45] Apr. 25, 1972

[54] FUEL CELL WITH ANODE CONTAINING A CATALYST COMPOSITION OF IRIDIUM AND RUTHENIUM

[72] Inventor: John S. Batzold, Westfield, N.J.
[73] Assignee: Esso Research and Engineering Company
[22] Filed: July 16, 1969
[21] Appl. No.: 847,500

Related U.S. Application Data

[63] Continuation of Ser. No. 381,899, July 10, 1964.

[52] U.S. Cl. ..................................136/86 D, 136/120 FC
[51] Int. Cl. ................................H01m 27/04, H01m 13/06
[58] Field of Search ..............................................136/86, 120

[56]           References Cited

UNITED STATES PATENTS

| | | | |
|---|---|---|---|
| 3,223,556 | 12/1965 | Cohn | 136/86 |
| 3,287,171 | 11/1966 | Holt | 136/120 |
| 3,291,753 | 12/1966 | Thompson | 252/447 |
| 3,276,976 | 10/1966 | Juliard | 204/43 |

OTHER PUBLICATIONS

Mellor, Comprehensive Treatise on Inorganic & Theoretical Chemistry Vol. 15 Longmans, Green and Co., N.Y. 1936 QD31M4 pp. 747

Primary Examiner—Winston A. Douglas
Assistant Examiner—M. J. Andrews
Attorney—Whelan, Chasan, Litton, Marx & Wriglet and Henry Berk

EXEMPLARY CLAIM

1. In a fuel cell comprising an anode, a cathode and an electrolyte positioned between and communicating with said anode and cathode, the improvement wherein said anode comprises a catalyst composition consisting essentially of co-reduced iridium and ruthenium where the atom ratio of each component to the total catalyst is in the range of from 25 to 75 percent.

4 Claims, No Drawings

FUEL CELL WITH ANODE CONTAINING A CATALYST COMPOSITION OF IRIDIUM AND RUTHENIUM

This application is a continuation of Ser. No. 381,899, filed July 10, 1964.

Heretofore in the art, noble metal catalysts containing platinum were required in systems utilizing an acid electrolyte. Various nonplatinum materials and mixtures thereof were tried as catalysts but none were particularly efficient.

It has now been found that a particular combination of noble metals containing no platinum will function efficiently as the catalyst in a system utilizing either an acidic or basic electrolyte.

The catalyst of this invention consists of iridium which is useful as a catalyst in certain systems but is not too efficient and ruthenium which is not effective as a catalyst since it polarizes to a value greater than one at very low current densities. Therefore, for all practical purposes, ruthenium is inactive as a catalyst.

The catalyst of this invention can be used as a catalyst in chemical reactions to initiate or accelerate reactions in anodic oxidations and cathodic reductions, in hydrogenation reactions, hydrocracking reactions and in polymerization reactions.

The catalyst of this invention is made by coreducing a mixture of ruthenium and iridium salts. The mixture of salts can be in solution or supported upon a body. The reduction can be by chemical means such as reduction with $NaBH_4$, $KBH_4$, formaldehyde, formic acid, diborane or the radical anion procedure as set forth in U.S. Pat. No. 2,177,412. The materials may also be reduced with gases such as hydrogen and CO at low temperatures or at elevated temperatures of greater than 800° F.

Examples of salts which can be used in the production of the instant catalyst include $RuCl_3$, $RuCl_4 \cdot 4H_2O$, $Ru(OH)_3$, $RuO_2 \cdot xH_2O$, $RuO_4$, $IrBr_3 \cdot 4H_2O$, $IrBr_4$, $IrCl_2$, $IrCl_4$, $IrI_3$, $Ir_2O_3$, $Ir_2O_3 \cdot xH_2O$, $Ir(OH)_4$, $Ir_2S_3$, $IrS_2$ and $Ir(HS)_3 \cdot 2H_2O$. The foregoing salts are put into solution and then reduced. The finely divided precipitate is then washed with water and soaked in an alkali metal hydroxide such as NaOH, KOH and LiOH or other basic solutions having a pH greater than 9 for from 0.02 to 30 hours. The materials are then washed and are ready for use. The finely divided precipitate will be in a lower oxidation state than when it was in the salt. In some cases, the oxidation state will be zero.

The catalyst of the present invention comprises a combination of iridium and ruthenium. The ratio of ruthenium to the total catalyst is in the range of from 25 to 75 atom percent and the ratio of iridium to the total catalyst is in the range of from 75 to 25 atom percent. The preferred ratio is a 50/50 mixture.

The following examples are submitted for the purpose of illustration only and are not to be construed as limitations upon the scope of the invention as set forth in the appended claims.

EXAMPLE 1

A series of catalysts were prepared by $NaBH_4$ reduction at about 167° F. of mixed salt solutions followed by soaking in KOH for 10 hours. The catalysts were tested in the anodic oxidation of methanol at 140° F. and utilizing a 3.7M sulfuric acid electrolyte. Seven catalysts were tested varying in composition from 100 percent iridium to 100 percent ruthenium. The mixed catalysts varied from 10 percent ruthenium and 90 percent iridium up to 90 percent ruthenium and 10 percent iridium. The composition of the electrodes and their performance data are set forth in Table I below.

TABLE I

| Catalyst atom, percent | Volts polarized from theoretical methanol at indicated ma./cm.² | | |
|---|---|---|---|
| | 10 | 50 | 100 |
| 100-iridium | 0.47 | 0.50 | 0.52 |
| 90-iridium—10-ruthenium | 0.37 | 0.43 | 0.46 |
| 70-iridium—30-ruthenium | 0.32 | 0.37 | 0.39 |
| 50-iridium—50-ruthenium | 0.28 | 0.33 | 0.37 |
| 30-iridium—70-ruthenium | 0.30 | 0.35 | 0.39 |
| 10-iridium—90-ruthenium | 0.33 | 0.43 | >0.7 |
| 100-ruthenium | >1.0 | | |

It can be seen from Table I that by coreducing ruthenium, an inactive catalyst, with iridium, a very poor catalyst, one gets a very effective catalyst.

EXAMPLE 2

A mixture of iridium and ruthenium salts is reduced by treatment in accordance with the procedure set forth in U.S. Pat. No. 2,177,412 and the finely divided precipitate is then soaked in NaOH for about 15 hours. The material so produced is an effective catalyst.

EXAMPLE 3

Two catalysts were made. Catalyst A was the coreduction in accordance with this invention and the second catalyst consisted of a physical mixture of ruthenium and iridium. This catalyst is denoted B. Catalyst A was made by immersing silica gel in a 50/50 solution of ruthenium and iridium chloride salts. The silica gel was then dried and then immersed in an aqueous potassium borohydride reducing solution in order to reduce the metal ions of the salts. The silica gel was then dried and immersed in a 6N KOH solution in order to dissolve the silica gel. Catalyst B was made by reducing iridium from a solution of a salt with sodium borohydride and separately reducing ruthenium from a solution of its salts with sodium borohydride and then physically mixing the two reduced metals. Catalysts A and B were then tested as the anode catalyst in a fuel cell utilizing methanol as the fuel, air as the oxidant and 30 wt. percent sulfuric acid as the electrolyte. The results of these tests are set forth in Table II below.

TABLE II

| Catalyst | Volts polarized from theoretical methanol at indicated ma/cm² | | |
|---|---|---|---|
| | 10 | 50 | 100 |
| A | 0.30 | 0.33 | 0.36 |
| B | 0.46 | 0.51 | 0.53 |

What is claimed is:

1. In a fuel cell comprising an anode, a cathode and an electrolyte positioned between and communicating with said anode and cathode, the improvement wherein said anode comprises a catalyst composition consisting essentially of coreduced iridium and ruthenium where the atom ratio of each component to the total catalyst is in the range of from 25 to 75 percent.

2. In a fuel cell as defined in claim 1, the improvement wherein said catalyst composition consists essentially of a coreduced combination of 50 atom percent ruthenium.

3. In a fuel cell comprising an anode, a cathode, an electrolyte positioned between and communicating with said anode and cathode, fueling means for supplying methanol to said anode, and means for supplying an oxidant to said cathode, the improvement wherein said anode comprises a catalyst composition consisting essentially of coreduced iridium and ruthenium where the atom ratio of each component to the total catalyst is in the range of from 25 to 75 percent.

4. In a fuel cell as defined in claim 3, the improvement wherein said catalyst composition consists essentially of a coreduced combination of 50 atom percent ruthenium.

* * * * *